Jan. 18, 1966  E. J. AMELANG  3,229,325
APPARATUS FOR EXTRACTING CRAB MEAT
Filed Oct. 11, 1963  2 Sheets-Sheet 1
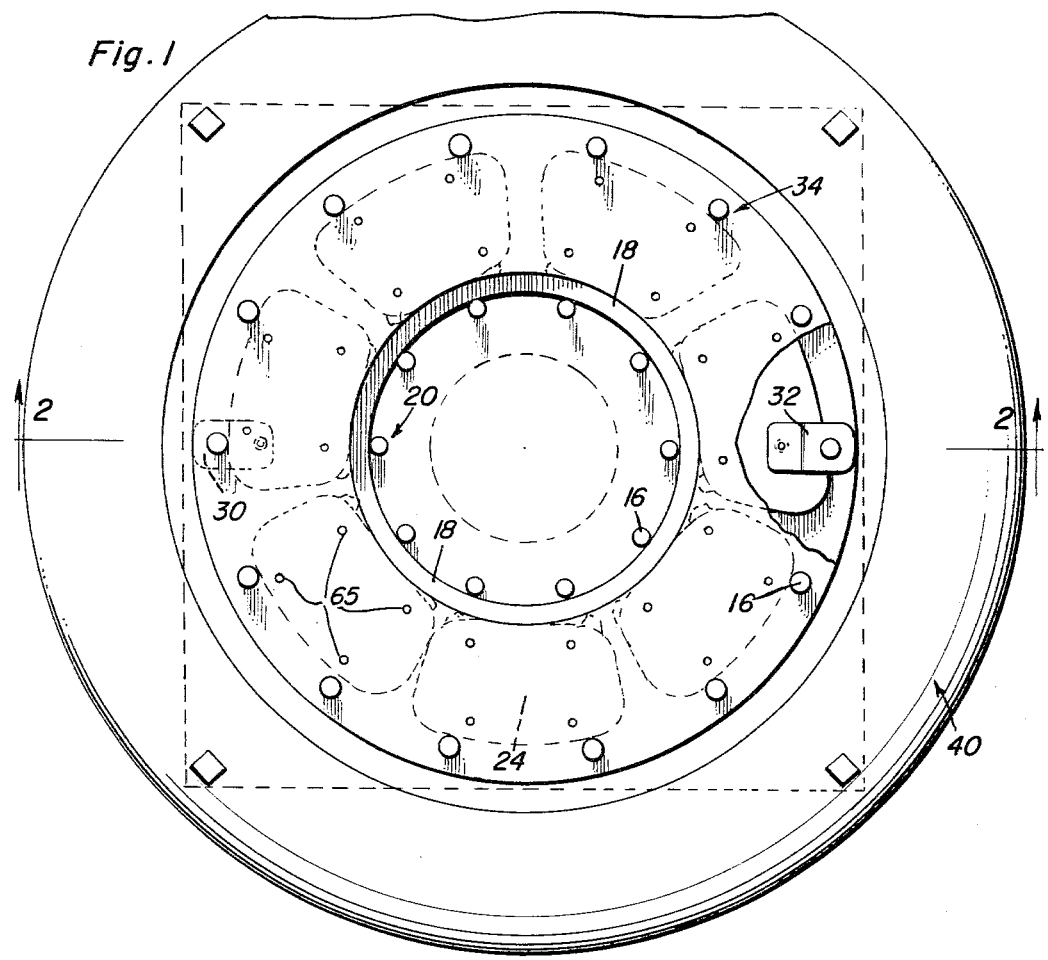
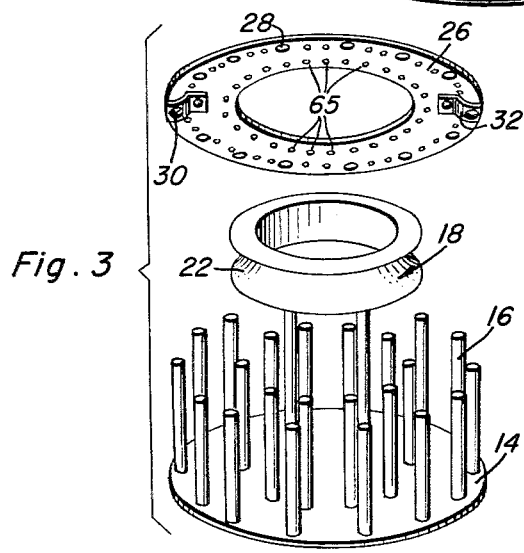
Ernst J. Amelang
INVENTOR.

Jan. 18, 1966    E. J. AMELANG    3,229,325
APPARATUS FOR EXTRACTING CRAB MEAT
Filed Oct. 11, 1963    2 Sheets-Sheet 2
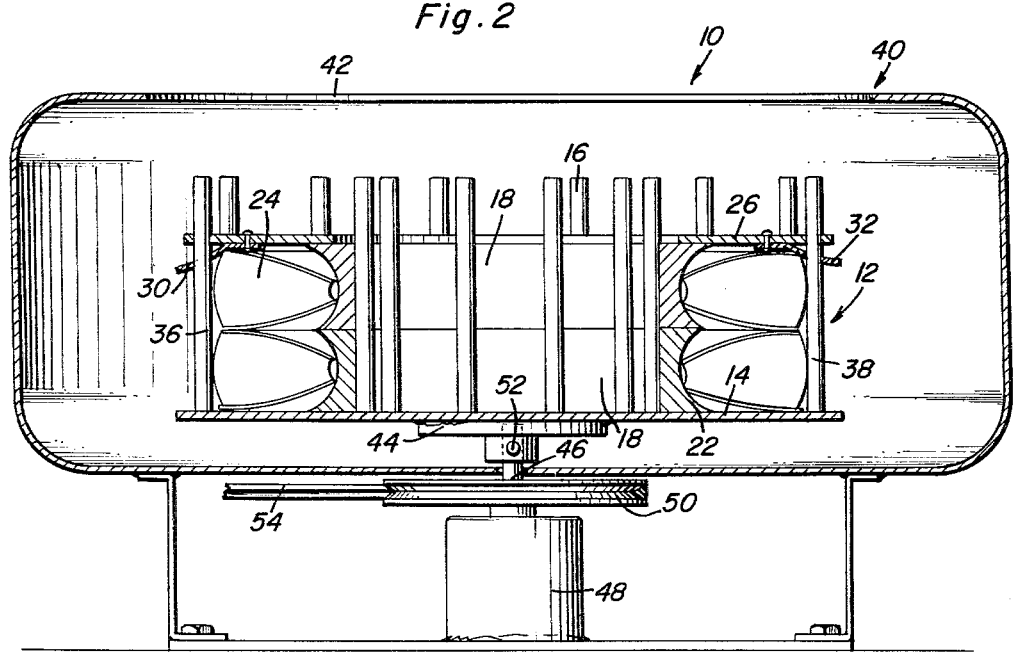
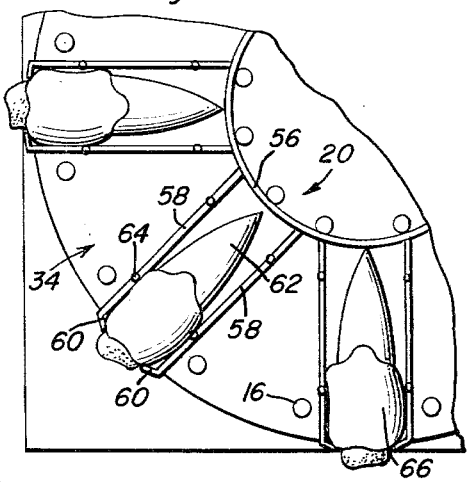
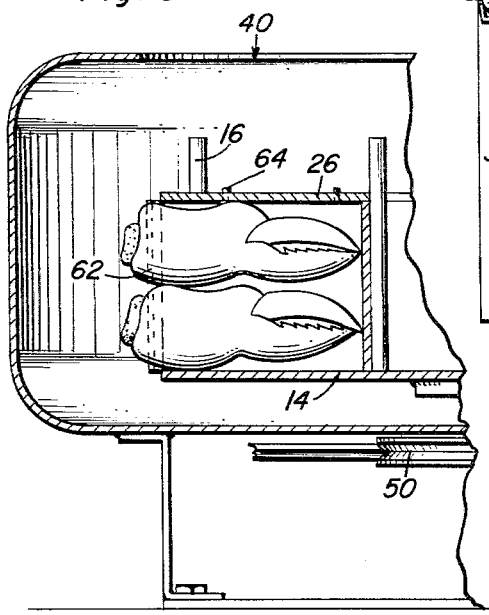
Ernst J. Amelang
INVENTOR.

united States Patent Office 3,229,325
Patented Jan. 18, 1966

3,229,325
APPARATUS FOR EXTRACTING CRAB MEAT
Ernst J. Amelang, Houston, Tex., assignor of twenty percent to Hill, Brown, Kronzer, Abraham, Watkins & Steely, all of Houston, Tex., a law firm
Filed Oct. 11, 1963, Ser. No. 315,520
3 Claims. (Cl. 17—2)

This invention primarily relates to a novel means for extracting and recovering meat from edible crabs.

Prior art methods and means for extracting crab meat from crabs have for the most part resulted in a great amount of waste of usable crab meat. These methods and devices have previously been concerned with cutting a cylindrical core from the body of the crab. In distinction, it is the primary object of this invention to disclose a means for fully recovering edible meat from crabs by extracting the meat out of the whole crab and even out of the claws.

A further object of this invention is to disclose a means for extracting meat from the crab shells wherein the number of crabs that may be de-meated at any one time is only limited by the dimensions of the means which comprises the apparatus forming a part of the subject matter of the instant invention.

A still further object of this invention resides in a novel apparatus in which the crab shells to be de-meated may be placed and then rotated at a high speed to cause separation of the meat from the crab shell surrounding it by the action of centrifugal forces.

Another object of this invention resides in apparatuses especially adapted for holding the claws of a crab within the centrifugal separator previously noted whereby the meat enclosed within the claw shells may be removed by centrifugal action in a similar manner as the meat in the body halves.

Yet another object of this invention resides in the fact that the apparatus used in the present invention is simple in construction, highly efficient in use and readily disassembled for maintenance purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the apparatus used in conjunction with the present invention;

FIGURE 2 is a cross-sectional view taken substantially along the plane indicated by the line 2—2 of FIGURE 1 and illustrates the various components of the apparatus including the novel spinner basket in which the crab parts from which meat is to be recovered are held and spun;

FIGURE 3 is an exploded perspective view of the components of the spinner basket;

FIGURE 4 is a fragmentary top plan view of a slightly modified form of spinner basket for use in separating crab meat from the claws of the crab; and FIGURE 5 is a fragmentary sectional view taken on a section similar to FIGURE 2, but illustrating the use of the modified form of spinner basket for holding the crab claws.

Referring now to the drawings in detail, and more particularly to the embodiment of the invention as disclosed in FIGURES 1 to 3, the apparatus used in conjunction with the present invention for separating the crab meat from the crab shell is generally illustrated by the numeral 10. The apparatus 10 includes a spinner basket generally designated by the numeral 12 for holding crab parts while they are spun whereby the shell and meat may be separated by centrifugal forces. The spinner basket 12 includes a base plate 14 on which are mounted a plurality of vertical pins 16 arranged in concentric circles on said base plate. Crab part holder means comprising a leveling ring 18 is retained upon the base plate 14 by positioning the ring in abutting relation with an inner set 20 of said circularly arranged pins. As shown in the drawings, the set of pins 20 prevent the ring 18 from sliding on the base plate 14.

The ring 18 includes an annular groove 22 for holding a crab part such as 24. The crab part 24 is actually one-half of the body of the crab. In accordance with the method for fully recovering edible meat from crabs, the crabs are first rough cleaned by removing the top shell from the body portion, all appendages, and waste material from the abdominal cavity. The crab body is then split in half and each of the halves is subjected to a heated fluid medium such as steam or boiling liquid to loosen the meat residing therein. Then each of the crab body halves 24 is placed within the annular groove 22 in the ring 18 with the open edge portion of each half shell disposed outermost and thereafter the meat is separated from the body shell by the apparatus disclosed. As shown in FIGURE 2, a plurality of rings 18 may be stacked on the base plate 14. In this manner, a greater amount of meat can be separated at one time by the use of the apparatus and the rings further perform the function of keeping the crab halves level in the device. To complete the assembly a holddown ring 26 including circumferentially spaced apertures 28 and a pair of friction clamps 30 and 32 is adapted to be placed over the stacked rings 18 to clamp the same to the base plate 14. This is accomplished by passing an outer set 34 of pins through the circumferentially spaced apertures 28 on the ring 26 and camming the friction clamps 30, 32 into holding friction engagement with a pair of diametrically opposite upstanding pins such as 36 and 38.

The spinning basket 12 is enclosed within a suitable housing 40 having an access opening 42 in the top surface thereof. When the basket 12 is spun, the meat within the crab shell halves will be separated from the shells and will be collected within the housing 40. Thereafter, the meat can be removed through the access opening 42. Also, due to the access opening 42, the various parts of the spinning basket 12 may be removed for maintenance purposes.

A suitable bearing such as 44 may be welded or otherwise secured to the underneath surface of the base 14. A spindle 46 rotatably mounted within a column 48 is adapted to have a driving pulley sheave such as 50 secured thereto. A locking pin 52 locks the spindle 46 to the bearing 44. A suitable motor (not shown) having a driving connection to the pulley sheave 50 through a belt such as 54 is adapted to rotate the spindle 46 and consequently the base plate 14 and spinning basket 12 at a high rate of speed. The centrifugal force induced at the outer periphery of the rings 18 causes meat to separate from the crab shell halves and be collected within the housing 40.

Referring now specifically to the embodiment of the apparatus depicted in FIGURES 4 and 5, it will be subsequently seen that edible meat may also be recovered from the claws of the crab. By accomplishing this, complete meat recovery from all portions of the crab is made possible providing for a minimum or no wastage of meat at all. The embodiment of the apparatus depicted in FIGURES 4 and 5 is very similar to that shown in FIGURES 1 to 3 includes the housing 40, pulley sheave 50, base plate 14 and upstanding pins 16 arranged in the same concentric arrays. However, in lieu of the ring 18, a ring or hub 56 is utilized, positioned as the ring 18 about and in abutting contact with the inner set of pins 20. Radiating from the hub 56 is a plurality of partition members 58. These members 58 are flexible and are secured at one end to the hub 56. Adjacent members 58 include inturned portions 60 at their outer ends which are adapted to frictionally engage and hold the claws on the device. The claws 62 are stacked between adjacent partition members 58 and a pair of partition members having facing end portions 60 are disposed between a pair of pins 16 in the outer set 34. These pins 16 will bias and flex the resilient partition members 58 into frictional contact with the claws 62 wherein the inturned outer portion 60 of the partition members will overlie the end of the claws 52 and prevent their outward removal. A holddown plate 26 is then positioned over the claws to complete the assembly and is retained on the apparatus by passing the outer set of pins through the apertures 28. To insure their retention, each of the partition members 58 is formed with upstanding lugs 64 received through openings 65 formed in the holddown plate 26. In carrying out the method of recovering meat from the crab claws, it will be seen that a portion of the upper shell of the claw is broken away to expose the meat 66. This in essence will slightly loosen the meat from the claw. The claws are also boiled or steamed to further loosen the meat. Then, upon rotation of the spinning basket, centrifugal forces will separate the meat from the claws.

To summarize the method and apparatus used in the present invention, it should thus be apparent that all edible meat may be recovered completely from edible crabs by rough cleaning the crabs by removing the claws, breaking away the upper shell, cutting off legs and flippers and removing gills. The abdominal cavity can then be cleaned out and the crab body cut in two after which the claws and crab body halves may be boiled or steamed to loosen meat disposed within the shells thereof. Utilizing the device disclosed in FIGURES 1 to 3, the crab body halves may be secured to a spinning basket 12 by disposing the halves within the annular grooves 22 on a plurality of leveling rings such as 18 and clamping the crab halves to a base plate 14 by means of a holddown plate such as 26 frictionally engaged on upstanding pins of the device. The ring 26 will clamp the crab halves through the base plate 14. The crab halves are so disposed that they open toward the circumference of the spinning basket wherein upon rotation of the basket, the meat within the body halves may be flung against the walls of the housing 40 and collected therein. This will readily occur by the use of centrifugal force induced to act upon the meat within the crab body halves by rotating the spinning basket. The crab meat may also be recovered from the claws of the crab by using the device shown in FIGURES 4 and 5 which entails merely replacing the rings 18 by the hub 56 and partitions 58. The partitions 58 are frictionally biased into engagement with the claws 62 for retaining them during the rotation of the spinning basket 12. In this manner, crabs may be quickly cleaned and the meat recovered therefrom and very economical in a simple manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for centrifugally extracting meat from crab shell parts, a spinning basket including a generally horizontal base plate defining a center vertical axis about which said plate is adapted to be rotated, first and second sets of pluralities of upstanding and generally parallel pins supported at their lower ends from said base with each set of pins arranged in a circular pattern and disposed concentrically about said axis, the second set of pins being disposed radially inwardly of the first set of pins, crab holddown means in the form of generally horizontal annular plate means having a plurality of apertures formed therethrough, spaced circumferentially thereabout and arranged in a pattern complementary to the pattern of said first set of pins, said annular plate means being retained on said base plate in vertical spaced relation thereto with the upper ends of said first set of pins slidingly received through said apertures, said annular plate means including means releasably and operatively engaged with and adjustable vertically along at least some of said pins for retaining said annular plate means in adjusted vertically spaced relation relative to said base plate, said annular plate means being adapted to overlie and hold down the crab parts disposed on said base plate radially inwardly of said first set of pins whereby said pins and annular plate means will positively retain the shell parts from which crab meat is to be separated within said basket, the inner diameter of said annular plate means being greater than the diameter of said pattern of said second set of pins, said second set of pins projecting upwardly through the center of said annular plate means, and means surrounding said spinning basket for collecting separated crab meat.

2. The combination of claim 1 including at least one generally annular hub disposed on said base plate and including inner peripheral surfaces removably frictionally engaged with the radial outward surfaces of the second set of pins, the outer peripheral portions of said hub being disposed radially inwardly of the first set of pins whereby an annular area is defined between the outer peripheral surfaces of said hub and the first set of pins for receiving crab shell portions from which crab meat is to be extracted.

3. The combination of claim 1 including a plurality of pairs of circumferentially spaced and generally radially extending upstanding partition members disposed between and frictionally engaged with the upper and lower surfaces of said base plate and annular plate means, respectively, and releasably interlockingly engaged with said holddown plate means, the radial outermost end portions of the partition members of each pair of partition members being outwardly convergent and adapted to prevent claw portions disposed between the partition members of each pair of partition members from shifting radially outwardly of said spinning basket.

References Cited by the Examiner

UNITED STATES PATENTS

| 1,565,341 | 12/1925 | Umrath | 17—2 |
| 2,522,578 | 9/1950 | Johnson | 17—45 |
| 2,771,630 | 11/1956 | Hiller | 17—2 |
| 2,858,223 | 10/1958 | Harris | 99—111 |
| 2,978,334 | 4/1961 | Lapeyre | 99—111 |

FOREIGN PATENTS 18,671     1909    Great Britain.

SAMUEL KOREN, *Primary Examiner.*

H. LORD, LUCIE H. LAUDENSLAGER, *Examiners.*